Patented Aug. 3, 1954

2,685,538

UNITED STATES PATENT OFFICE 2,685,538

COATED PAPER AND PROCESS OF MAKING

John C. Stinchfield and Frank Kaulakis, Westbrook, Maine, assignors to S. D. Warren Company, Boston, Mass., a corporation of Massachusetts No Drawing. Application January 16, 1946, Serial No. 641,662

7 Claims. (Cl. 117—155)

This invention relates to mineral-coating composition and to paper coated therewith. Mineral-coating compositions, such as are commonly applied to paper body stock in the manufacture of mineral coated paper and the like, comprise aqueous suspensions of finely divided mineral matter, referred to herein as pigment, such as clay, calcium carbonate, blanc fixe, finely divided metals such as aluminum, color lakes, tinctorial oxides, or the like and an aqueous dispersion or solution of an adhesive such as casein, glue, starch or the like.

In general, mineral-coatings are applied to paper to improve the appearance, the printing qualities, or other properties of the paper. The mineral-coating covers the individual fibers of the paper surface and fills interstices between fibers, thus rendering the surface of the paper more level and more uniform in texture. It is primarily the pigment content of the coating composition which provides the desirable qualities of the coating, whereas the adhesive provides chiefly the function of suitably binding the mineral matter to the paper; e. g. so that it will not be removed by the pull of printing ink during the printing operation. Nevertheless, the particular adhesive used does have considerable influence upon the working qualities of the coating composition; e. g., viscosity, flow, spreadability, etc. Likewise the adhesive used in the coating composition has a definite effect upon the quality and appearance of the finished coated paper made therewith.

For example, the plasticity of the adhesive has a pronounced effect on the ability of the supercalender to produce a level and good printing surface.

It heretofore had been suggested to improve the folding quality and the flexibility of waterborne paper coatings containing casein as the adhesive by adding natural rubber latex, together with a known anti-oxidant, to the composition, the latex being added in an amount sufficient to provide rubber solids up to one-third the weight of the casein. The resulting coated paper as freshly prepared had a pleasing appearance and feel and showed improved folding quality. However, the coating layer, upon reasonably short (e. g., six to eight months) aging, discolored (darkened) badly and became brittle, i. e., lost its original flexibility and lost the temporarily conferred folding quality improvement.

One of the objects of this invention is to provide a new and improved type of paper coating composition including as the essential adhesive component a synthetic flexible and elastic substance which gives to the coated paper a definitely improved surface, which is characterized by being superior to those coating surfaces using the customary coating adhesives, specifically casein, in the following qualities: smoothness, flatness, calendered and uncalendered gloss, flexibility of film, fold, printing, ink setting, curl, and velvety feel.

Another object of this invention is to provide a new and improved type of paper coating composition using a hydrophobic adhesive, which gives better water resistance to the coated paper surface and less hygroscopicity. Another object of this invention is to provide a new and improved type of paper coating composition, which by its low viscosity, makes possible high solids operation, giving an improved coating machine operation.

These and other inventive objects are accomplished in accordance with this invention by coating paper with a mineral-coating composition containing coating pigments and, as the essential adhesive material, a primary aqueous dispersion of a rubbery emulsion polymer of a composition containing an ethylenically unsaturated monomer and produced by emulsion polymerization.

The term "synthetic elastomer" as used herein denotes a synthetic polymerized organic compound characterized by being of a definite elastic nature, and has the scope attributed to the term "elastomers" at p. 942 of "Industrial and Engineering Chemistry," vol. 31 (1939), pp. 941 et seq., article by Harry L. Fisher. This elasticity, as suggested by Fisher, may be either inherent in the molecular structure of the polymer or copolymer or it may be induced by physico-chemical action of an added plasticizer that partially solvates the polymer. Most compounds of this nature are plastic by temperature and/or plasticizer action. They also form a continuous coherent film structure when the water phase is lost by evaporation, whether at room temperature or by forced drying. Such synthetic elastomers are typified by butadiene-styrene copolymer, polychloroprene, butadiene-acrylonitrile copolymer, a copolymer of a major quantity of vinyl chloride and a minor quantity of vinylidene chloride, polyvinyl chloride, polymerized methyl acrylate, ethyl acrylate or butyl acrylate, or methyl, ethyl or butyl acrylate copolymerized with acrylonitrile or ethyl, methyl or butyl methacrylate, polystyrene and the like.

The term "primary aqueous dispersion" as used herein denotes an aqueous dispersion in which the polymer is formed in situ, by polymerization or copolymerization of a previously dispersed substance or substances of a lower molecular weight, e. g., monomers or dimers. For instance, styrene and isoprene may be dispersed by known methods in water and then copolymerized by heating, preferably under pressure, in the presence of a suitable catalyst such as benzoyl peroxide.

The primary aqueous dispersion is to be distinguished from what we call a "secondary aqueous dispersion," which latter is formed by dispersing in water a substance that has already been fully polymerized before dispersion. Primary dispersions, we have found to be more effective in binding pigments to paper than are secondary dispersions. This may be due to finer particle size, better inherent tack, or to specific surface characteristic of the dispersed particle due to the polymerization having taken place and existing in the form in which it is incorporated with the pigment. Whatever the reason for this phenomenon, we have found it to be true to the best of our belief.

The invention will be further illustrated, but is not limited by the following examples in which the quantities are stated in parts by weight unless otherwise indicated.

Example I

Thirty parts of a primary aqueous dispersion of a copolymer of styrene 60% and isoprene 40% composed of 12 parts of the copolymer solids and 18 parts of water were added to a suspension of 100 parts of a fine coating clay in 50 parts of water, which pigment had been previously dispersed in the usual manner with alkali.

This coating composition was applied to conventional body stock by a conventional coating machine, with a conventional weight of coating, 12 pounds per ream (25 x 38 x 500), and under conventional drying conditions.

The coated surface showed distinct improvements over a similarly coated sheet using casein as the adhesive, in the following characteristics: higher brightness, higher uncalendered gloss, enhanced wet rub resistance, a more satisfactory texture or feel, more flexibility and less curl; also, after easier calendering, enhanced smoothness and flatness, higher gloss, better folding properties, quicker ink setting, and better letterpress printing properties. No picking was encountered when printed by letterpress under standard conditions of temperature and humidity, with a standard letterpress ink.

In contrast to what has been observed when natural rubber has been used in mineral coatings in the past, no appreciable deterioration in color or flexibility took place when this coated paper was aged; no change was observed greater than normally occurs in ordinary mineral-coated papers in which the only adhesive is casein. This was in spite of the fact that isoprene is a somewhat unsaturated compound and so might be expected to show some deterioration upon aging.

The following coating compositions have been made and coated on paper giving generally similar results to those recited in Example I with a few minor variations as noted. Differences in properties from one composition to another were, of course, encountered.

Example II 75 parts of a fine coating clay dispersed in 46 parts of water were added to 25 parts of a primary aqueous dispersion of a copolymer of styrene and isoprene, composed of 7.5 parts of the copolymer solids and 14.5 parts of water.

Tested as in Example I, this composition gave no pick on printing. The calendered product was characterized by an outstanding "iciness" of the surface, satiny feel, and great flexibility. The term "iciness" is here used to mean a combination of true flatness of surface with high gloss.

Example III 30 parts of a primary aqueous dispersion of a copolymer of styrene and butadiene ("GR-S"), composed of 15 parts of copolymer solids and 15 parts of water were added to a suspension of 80 parts of a fine coating clay and 20 parts of $TiO_2$, in 100 parts of water.

Example IV 80 parts of a fine coating clay and 20 parts of ultra-marine blue dispersed in 90 parts of water were added to 10 parts of a primary aqueous dispersion of "Perbunan," a copolymer of butadiene and acrylonitrile, composed of 6 parts of copolymer solids and 4 parts of water.

Example V 100 parts of calcium carbonate dispersed with gum arabic in the usual method in 60 parts of water, was added to 8 parts of a primary aqueous dispersion of a copolymer of methylacrylate and acrylonitrile ("Rhoplex ER"), composed of 4 parts of the solids and 4 parts of water.

Example VI 10 parts of diethylhexyl phthalate (a plasticizer) emulsified in 6 parts of water, stabilized with 1 part of ammonium oleate, by means of a colloid mill, were mixed with 18 parts of a primary aqueous dispersion of polyvinyl chloride, composed of 10 parts of the polymer solids and 8 parts of water. To this mixture was added an aqueous suspension of 100 parts of a fine coating clay dispersed in 54 parts of water.

It was found that a coating of this composition was best dried (on the paper) at a temperature of the order of 200° F.

Example VII 3 parts of tricresyl-phosphate (a plasticizer) emulsified in 2 parts of water were mixed with 11 parts of a primary aqueous dispersion of polyvinylidene chloride, composed of 6 parts of polymer solids and 5 parts of water. To this mixture was added an aqueous suspension of 100 parts of blanc fixe dispersed in 100 parts of water.

Drying at about 200° F. or above was needed to obtain good adhesive strength.

Example VIII 25 parts of the plasticizer dibutoxy ethyl phthalate (commercial name "Kronisol") emulsified in 18 parts of water were mixed with 32 parts of a primary aqueous suspension of polystyrene composed of 15 parts of polymer solids and 17 parts of water. This mixture was added to a suspension of 100 parts of a fine coating clay dispersed in 60 parts of water.

Example IX 5 parts of dibutyl sebacate (a plasticizer) emulsified in 5 parts of water were mixed with 30 parts of a primary aqueous dispersion of a copolymer of styrene (80%) isoprene (20%) composed of 12 parts of copolymer solids and 18 parts of water. This mixture was added to a suspension of 100 parts of a fine coating clay dispersed in 60 parts of water.

Example X 7 parts of the plasticizer diethylhexyl phthalate emulsified in 4 parts of water was mixed with 18.5 parts of a primary aqueous dispersion of a polyvinyl chloride copolymer (i. e., "Geon"), composed of 10 parts of copolymer solids and 8.5 parts of water. This mixture was added to a suspension of 100 parts of a fine coating clay dispersed in 54 parts of water.

Elevated drying conditions gave good results.

Example XI

To 100 parts of finely divided aluminum flake dispersed with butyl alcohol in 425 parts of water was added 50 parts of a primary aqueous dispersion of a copolymer of styrene and isoprene, composed of 20 parts of solids and 30 parts of water.

Sheets coated with this showed the aluminum flakes well bound to the paper.

A great many water insoluble powders of varying natures can be bound by these dispersions, such as clay, calcium carbonate, aluminum powder or flake, colored lakes and toners, ochre, raw starch, cellulose flock and graphite.

Generally speaking, the adhesive range will fall between 3 and 25 parts of the elastomer per 100 parts of pigment, depending upon the adhesive, the pigment used and the use requirement of the coated paper. Many of the elastomers we have tested do not require over 10 parts per 100 of clay. The actual adhesive requirements can be varied widely by conditions in the manufacture of the primary aqueous dispersion, such as particle size, kinds and amount of constituent or constituents, ingredients for dispersion and conditions of polymerization (such as temperature, catalyst, pressure, time and concentrations). The use requirement of the coated paper (i. e., letterpress or offset printing, box covers, etc.) also determines the ratio of adhesive to pigment.

We claim:

1. A mineral coated paper product consisting of a paper sheet or web carrying on a surface thereof a coating comprising a pigment component of finely divided pigmentary mineral matter and an adhesive component containing, for each 100 parts by weight of the pigment, from 3 to 25 parts by weight of a rubbery polymer selected from the group consisting of a copolymer of styrene and isoprene, a copolymer of styrene and butadiene, a copolymer of butadiene and acrylonitrile, and a copolymer of methylacrylate and acrylonitrile, said coating being formed on the paper by applying thereto an aqueous dispersion of the pigment and the said copolymer, the latter being in the form of a primary aqueous dispersion produced by emulsion polymerization of the monomers of said copolymers.

2. A mineral coated paper according to claim 1 wherein the rubbery emulsion polymer is a copolymer of styrene and butadiene.

3. A mineral coated paper according to claim 1 wherein the rubbery emulsion polymer is a copolymer of butadiene and acrylonitrile.

4. A mineral coated paper according to claim 1 wherein the rubbery emulsion polymer is a copolymer of methylacrylate and acrylonitrile.

5. A mineral coated paper according to claim 1 wherein the rubbery emulsion polymer is a copolymer of styrene and isoprene.

6. A process of producing mineral-coated printing paper of high brightness and having high ink receptivity which comprises coating at least one side of a paper body stock with an aqueous slurry consisting essentially of water, a pigment and from 4 to 25 percent, on the weight of the pigment, of a binder consisting of a copolymer selected from the group consisting of a copolymer of styrene and butadiene and a copolymer of styrene and isoprene, said binder being the sole binder for said pigment, said pigment being supplied in an amount sufficient to provide the major portion of the solids content of said slurry, and drying and calendering the coated paper body stock.

7. A process of preparing a mineral-coated paper product consisting of a paper sheet or web carrying on the surface thereof a coating which comprises applying to a paper an aqueous dispersion of a pigment component of finely divided pigmentary mineral matter and an adhesive component containing, for each 100 parts by weight of the pigment, from 3 to 25 parts by weight of a rubbery polymer selected from the group consisting of a copolymer of styrene and isoprene, a copolymer of styrene and butadiene, a copolymer of butadiene and acrylonitrile and a copolymer of methylacrylate and acrylonitrile, the copolymer being in the form of a primary aqueous dispersion produced by an emulsion polymerization of the monomers of said copolymer and thereby forming the said coating on the paper.

References Cited in the file of this patent

UNITED STATES PATENTS

| Number | Name | Date |
|---|---|---|
| 693,189 | Thompson | Feb. 11, 1902 |
| 1,982,018 | Owen | Nov. 27, 1934 |
| 2,204,520 | Walker et al. | June 11, 1940 |
| 2,287,348 | Hayden | June 23, 1942 |
| 2,317,725 | Billig | Apr. 27, 1943 |
| 2,343,093 | Smith | Feb. 29, 1944 |
| 2,394,616 | Knoth et al. | Feb. 12, 1946 |
| 2,395,992 | Clark | Mar. 5, 1946 |
| 2,416,232 | Soday | Feb. 18, 1947 |
| 2,428,716 | McGill et al. | Oct. 7, 1947 |
| 2,431,745 | Flanagan | Dec. 2, 1947 |

FOREIGN PATENTS

| Number | Country | Date |
|---|---|---|
| 480,679 | Great Britain | Feb. 24, 1938 |

OTHER REFERENCES

Industrial and Engineering Chemistry, vol. 31, pages 941–945, August 1939.

Transactions, Institution of the Rubber Industry, vol. 6, page 46.